(12) United States Patent
Viaud

(10) Patent No.: US 7,353,753 B2
(45) Date of Patent: Apr. 8, 2008

(54) CONTROL ARRANGEMENT

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/682,344

(22) Filed: Mar. 6, 2007

(65) Prior Publication Data

US 2007/0209530 A1    Sep. 13, 2007

(30) Foreign Application Priority Data

Mar. 10, 2006    (DE)    ............. 10 2006 011 134

(51) Int. Cl.
*B30B 5/06*    (2006.01)

(52) U.S. Cl. .................. 100/88; 100/45; 100/87; 100/100; 56/341; 56/344

(58) Field of Classification Search ............. 100/43, 100/45, 48, 87, 88, 89, 100; 56/341, 344
See application file for complete search history.

(56) References Cited

U.S. PATENT DOCUMENTS 6,457,295 B1 * 10/2002 Arnold ................ 53/211

2005/0045051 A1 * 3/2005 Viaud et al. ............ 100/88

FOREIGN PATENT DOCUMENTS

| DE | 199 10 555 | 9/2000 |
|---|---|---|
| EP | 1 512 320 | 3/2005 |

* cited by examiner

*Primary Examiner*—Jimmy T. Nguyen

(57) ABSTRACT

A rotobaler is provided with an inclination sensor that recognizes an inclination to the side as well as in the longitudinal direction. This inclination sensor generates a signal coupled to a computer that, in turn, controls a display arrangement in order to indicate whether a base that is to be unloaded from the rotobaler can be safely unloaded considering the existing inclination of the rotobaler. In the event an unsafe inclination is present, either the computer sends out a control signal which blocks an operation for depositing the bale on the ground, or causes the bale to be oriented in such a way during the discharge process that the longitudinal centerline of the bale is parallel to the inclination of the slope.

10 Claims, 3 Drawing Sheets

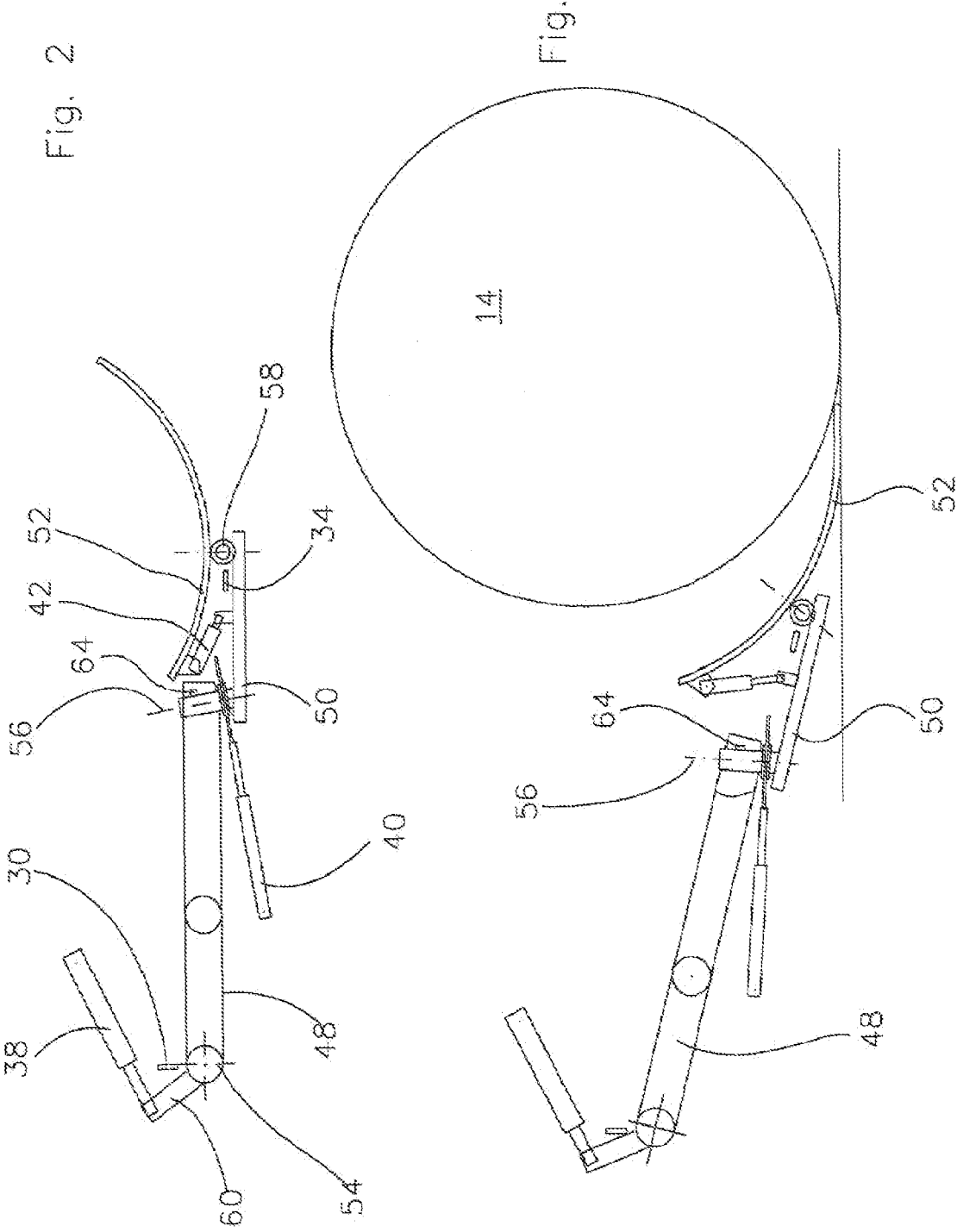

CONTROL ARRANGEMENT

FIELD OF THE INVENTION

The invention concerns a control arrangement of a vehicle that deposits cylindrical bales on the ground, with an inclination sensor, that generates a signal from the inclination of the vehicle, as well as a rotobaler or a bale wrapping arrangement.

BACKGROUND OF THE INVENTION

DE 199 10 555A1 discloses a rotobaler with a discharge arrangement configured as a scale for a cylindrical bale. An inclination sensor is associated with this discharge arrangement, it corrects the results of the weighing that may have been in error due to the inclination.

EP 1 512 320 A2 reveals a rotobaler that deposits a cylindrical bale on the ground, where the exit of the cylindrical bale is limited by a double-wing door and its position is corrected, if necessary so that it cannot roll down any slope.

The problem underlying the invention is seen in the fact that the deposit of a cylindrical bale on a slope is, as ever, a serious matter, and that problems can be avoided only with highly trained operators, or that a bale lying on the ground must be slid into the correct position and can be damaged by such sliding.

SUMMARY OF THE INVENTION

According to the present invention there is provided a control arrangement for controlling the deposit of a bale onto the ground in accordance with a sensed inclinations of the ground.

In this way the bale is deposited in such a way that its axis of rotation or its longitudinal centerline directly follows the inclination of the slope. In contrast to the state of the art, a bale weighing up to a ton need not be turned on the ground, which is possible only with difficult anyway with a relatively light baler. Since the bale is not slid along the ground, its possible wrapping (foil, net) is not damaged. It is also not possible that the bale rolls down a slope into the back side of the baler, before its position is corrected. The inclination sensor is preferably configured in such a say that it can detect the inclination of the slope in the direction of operation as well as transverse thereto; it may be configured mechanically, hydraulically or electrically, for example as a mercury level. Obviously, several simple inclination sensors, each operating in only one direction, could be provided that generate a signal together. The inclination sensor can be equipped with a damping device that avoids undesirable excursions due to uneven ground. The inclination of the vehicle or of the ground on which it stands, can also be determined by means of G.P.S., so that the inclination sensor consists of little more than a receiver that receives the G.P.S. data and conveys these to the computer. The signal can be used in a multitude of ways, beginning with a simple acoustic guidance up to a fully automatic steering of the vehicle into a safe position on the slope. The vehicle may be self-propelled or it may be a towed vehicle, for example, a baler a bale wrapping arrangement of the like.

The use of an acoustic or visual indicator arrangement, comparable to a parking assistance device, can provide an operator with sufficient assistance, for example, for the orientation of the vehicle on the slope. But it can also transmit a warning signal from which the operator can recognize that he is not permitted to unload a bale and cannot do so as long as the warning signal continues. Several levels of alarms can be called for that, for example, depend on the presence of risks in the vicinity of the deposit site such as a road. The display arrangement may include pointers, and indicator light and the like, or a monitor.

A semi-automatic or a fully automatic deposit of the bale into a safe position is made possible if the vehicle itself and/or the discharge arrangement attached to it can be repositioned by means of actuating arrangements. The position required at any given time, for example, the angle between a rotobaler and a bale wrapping arrangement or between a towing vehicle and the rotobaler can be varied in such a way that finally the bale can be deposited safely. By the same token, a discharge arrangement can also be oriented in such a way that either the rotational axis of the bale follows the inclination of the slope or the bale is deposited on the ground, on its end face. The computer may be an on-board computer on the towing vehicle or on the vehicle itself. The actuating arrangement is configured as an electric motor or a hydraulic motor, preferably operating as a linear motor.

An orientation of the bale in such a way that it can either be deposited on its end face or that its axis rotation follows the inclination of the slope, can be attained in such a way that a carrier is provided on the discharge arrangement that can be pivoted in various directions. Corresponding pivoting axes can be provided by articulated shafts, ball joints, universal joints or the like. However, more that two axes can be provided, so that the carrier can be brought into any desired position. The carrier may be a trough, a basket, a plate, pliers or the like that carries the bale in such a way that it does not fall down or tall out during its positioning.

If the carrier is configured with a concave surface, the cylindrical bale is supported safely. The depth of the trough is a function of the inclination of the slopes to be expected, the size of the bale, the speed and the method of handling it.

While the bale could fundamentally fail out of the baler that forms the vehicle and fall directly onto the ground, such a resulting force, that is particularly detrimental on a slope, is avoided in that the bale is caught and deposited on the ground in a controlled manner. Since this movement is normally executed as a pivoting movement instead of a parallelogram movement, that axis is provided with an inclination to the ground, it is located between a horizontal pivoting arm and a vertical pivoting arm in a raised position of the vertical pivoting arm, the inclination extends approximately vertically in a condition close to the ground. The vertical pivot arm itself is a moved about an axis preferably extending transverse to the direction of operation and normally in the plane of the inclination of the slope. However, the horizontal pivot arm could be rotated or pivoted about an axis extending in the direction of operation, so that the bale can be deposited on its end face.

Position sensors, each of which recognizes or detects the relative movement or the relative position between components associated with one axis, for example, the carrier and the horizontal pivot arm, can be provided in the form of a stepper motor, as well as a potentiometer, reed switches, so-called active hydraulic cylinders and the like. Non-contacting position sensors could also be used, the only thing that is significant is the fact that the position of the adjustable components must be recognizable and can be set in relation to the inclination as detected. Although preferrably such a position sensor could be provided on each axles but the corresponding information could also be attained with possibly only one non-contacting sensor that detects all components considered here.

In addition, the safety during the unloading of a bale is enhanced if an outlet arrangement that must be actuated for the unloading of the bale cannot be activated as long as the control arrangement recognizes a situation that is fraught with risk; in addition to a warning signal, an associated actuating arrangement can be locked or can be deactivated.

In addition to the safe deposit of the bale, the control arrangement can also be used to correct a value for the weight of the bale as a function of the inclination.

Rotobalers and bale wrapping arrangements are frequently applied on slopes with inclinations, in order to increase their output and in order to possibly apply them as non-stop implements, for this purpose a control arrangement is applied that is described above.

BRIEF DESCRIPTION OF THE DRAWINGS

The drawing shows an embodiment of the invention that shall be described in greater detail in the following.

FIG. 2 shows a side view of the discharge arrangement of FIG. 1 in a raised position.

FIG. 3 shows a side view of the discharge arrangement of FIG. 1 in a lowered position.

DESCRIPTION OF THE PREFERRED EMBODIMENT

Figure 1:
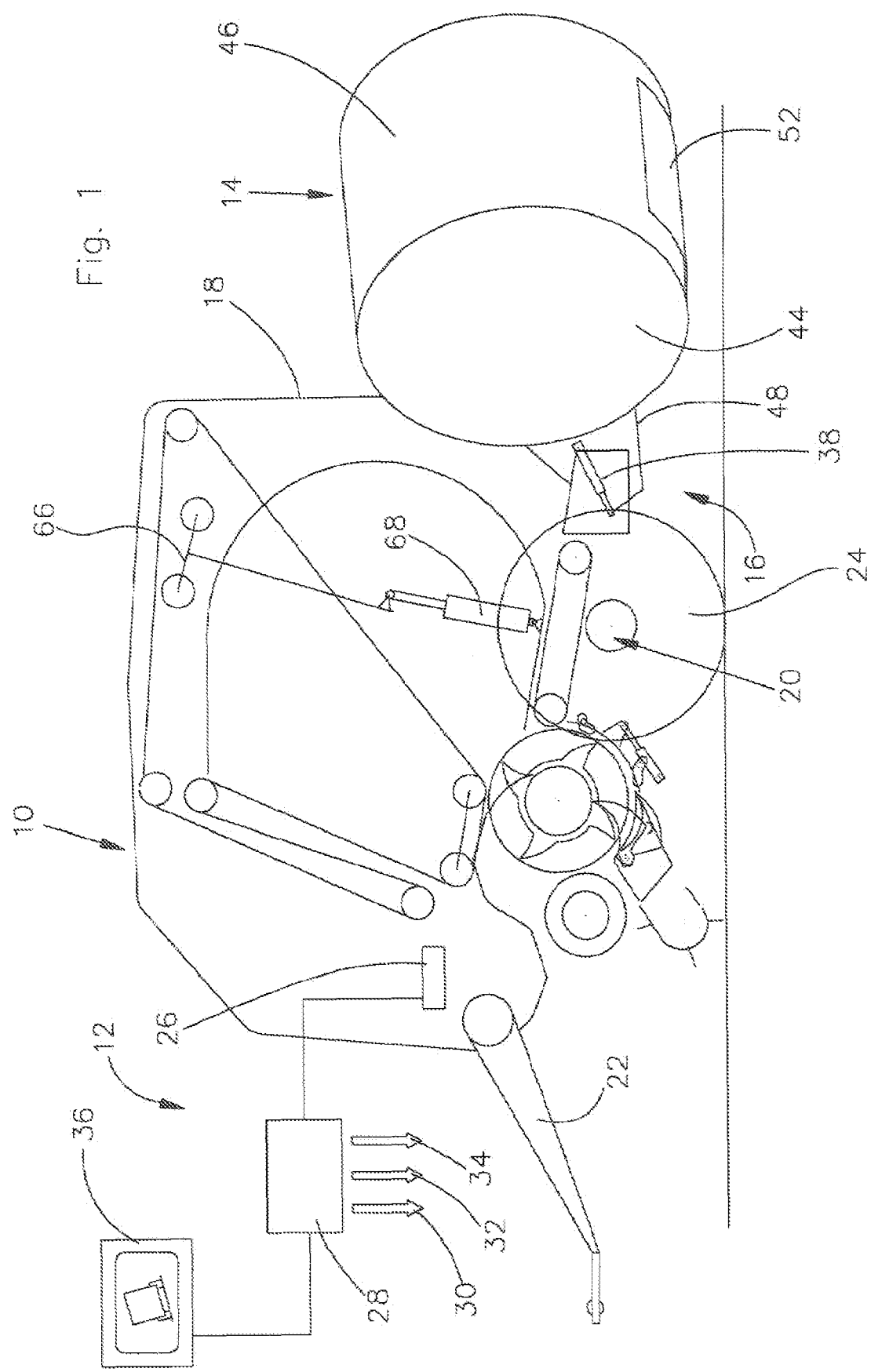
FIG. 1 shows a schematic side view of a vehicle with a control arrangement and a discharge arrangement.

A vehicle 10, shown in FIG. 1, is shown there as a rotobaler that can be attached to a towing vehicle, not shown, it is provided with a control arrangement 12 and forms a cylindrical bale 14 that can be deposited on the ground by means of a discharge arrangement 16.

Aside from a multitude of components of no significance to the invention, the vehicle 10 is provided with a frame 18, a chassis 20, a towbar 22 and the outlet arrangement 66.

The frame 18 rests on the chassis 20, carries the towbar 22 at its front and the discharge arrangement 16 towards the rear.

The chassis 20 is supported on wheels 24 on the ground and follows an inclination extending transverse to the direction of operation and thereby the stands more or less steeply on the slope. The wheels 24 or the chassis 20 as a whole could be attached relative to the frame 18 so that it can be steered.

The outlet arrangement 66 is configured as a so-called gate, outlet flap or the like and can be brought into a raised positioned in which bale 14, completed in the vehicle, can leave the vehicle 10. For this purpose an actuating arrangement 68 is provided that can be activated hydraulically.

The control arrangement 12 includes, among other items, an inclination sensor 26, a computer 28, three position sensors 30, 32, 34, a display arrangement 36 and three actuating arrangements 38, 40, 42, that are connected to each other in a wireless manner or by lines. The purpose of the control arrangement 12 is to recognize in what special relationship the vehicle 10 is on a slope in order to steer the discharge arrangement 16 in such a way that the bale 14 is deposited so that it is prevented from rolling down a slope.

The inclination sensor 26 may be configured, for example, as a mercury level and recognizes in what direction the vehicle 10 is inclined relative to an absolute position. The inclination sensor 26 generates a signal, preferably an electronic signal, from which it can be recognized whether the vehicle 10 is inclined in the transverse and/or longitudinal direction and to what degree. A damping device, not shown, will provide the assurance that changes in position due to uneven ground and not significant to the output. The inclination of the slope could also be derived from other factors, for example, from forces on the towbar 22, from side forces on the wheels 24, particularly in the case of a tandem axle etc.

The computer 28 is configured as an on-board computer on the towing vehicle or is attached as a calculator 28 to the vehicle 10 itself. CAN-bus technology can be used for the transmission of the signal. The signal of the inclination sensor 26 is processed in the control arrangement 12 that is, for example, amplified, linked to other signals, and an output signal generated from these, for example, for a display on the display arrangement 36 or an acoustic alarm. A different output signal is generated for the change in position of the actuating arrangements 38 through 42 from which, for example, electro-hydraulic valves, not shown, are controlled. The computer 28 can be provided with an input arrangement, for example, a keyboard, a touch screen, a voice control or the like, so that an operator can end or activate and affect the signal processing. The signal generated by the computer 28 is configured in such a wavy that the actuating arrangements 38 through 42 deposit the bale 14 in such a position that prevents it from rolling down the slope. The computer 28 can also be connected with a weighing arrangement 64 in order to correct its signal so as to eliminate effects due to the inclination of the slope.

The position sensors 30 through 34 are used to determine the value of the repositioning achieved by the associated actuating arrangements 38 through 42 and to report back to the computer 28 in the case of any regulation. The position sensors 30 through 34 nay be configured alike or differently, for example, as potentiometer, as reed switches etc.; each of these operate in one plane and thereby recognize the elative position of the components repositioned by the corresponding actuating arrangements 38 through 42. The position sensor 30 detects the position of the bale 14 above the ground and the position sensor 32 detects the position of the bale 14 relative to a longitudinal center plane of the vehicle 10.

The display arrangement 36 may be a simple pointer, a true picture with an indicator of a critical or a non-critical position of the vehicle 10 or of the discharge arrangement 16, a graphical display, that provides steering advice etc.; it is preferably located on the towing vehicle and is connected with the computer 28.

The actuating arrangements 38 through 42 are configured as hydraulic motors or as electric motors and are repositioned by external forces in one or in both directions, depending on requirements. The actuating arrangements 38 through 42 can also be provided internally with position sensors 30 through 34 as so-called active cylinders.

The bale 14 is cylindrical and includes an end face 44 and a circumferential surface 46; the diameter may amount to as much as 1.8 to 2 meters. Immediately after leaving the vehicle 100 the bale 14 can be deposited on the ground or directly delivered to a foil wrapping arrangement where it is wrapped for formation into silage.

The discharge arrangement 16 is used to accept the bale 14 from the vehicle 10 and to deposit it on the ground where the deposit is controlled by the actuating arrangements 38 through 42 in such a way that the bale cannot roll away. The discharge arrangement 16 can be attached directly to the vehicle 10 or it may be part of a train that can be towed behind the vehicle 10 and steered relative to the latter. Among other items, the discharge arrangement 16 includes a vertical pivot arm 48, a horizontally pivot arm 50 and a carrier 52. The vertical pivot 48 is connected in joints so as to pivot about an axis 54 on the frame 18, the horizontal pivot arm 50 is connected in joints so as to pivot about an axis 56 on the vertical pivot arm 48 and the carrier 52 is connected in joints so as to pivot about an axis 58 on the horizontal pivot arm 50.

The vertical pivot arm 48 extends generally across the width of the vehicle 10, is configured in part in a U-shape and is connected to both sides of the vehicle 10 so as to pivot vertically. It is located underneath a discharge opening of the vehicle 10 in such a way that the carrier 52 can accept the bale 14. One or more lever arms 60 are provided in a forward region, they engage one or more actuating arrangements 38 whose other ends are supported on the frame 18. The vertical pivot arm 48 is provided with a support arm 62 in the rear region, the axis 56 is located in the tree end region of the support arm. The support arm extends in the longitudinal center region of the vehicle 10. Normally the axis 54 extends horizontally and transverse to the longitudinal center plane of the vehicle 10. This axis is configured in the form of journals, a shaft or the like. The position sensor 30 is located in the region of the axis 54, it can determine the relative position between the vertical pivot arm 48 and the frame 18 thereby its position relative to the ground, it can be attached to the frame 18 as well as to the vertical pivot arm 48.

In its forward region, the horizontal pivot arm 50 is provided with the axis 56 in its rear region with the axis 58, which extend at an angle of 90° to each other and are also configured in the form of shafts, journals etc. The horizontal pivot arm 50 can be pivoted through an angle of 90° to each side relative to the longitudinal center plane of the vehicle 10 it is rotated by means of the actuating arrangement 40 or by a rack and gear connection. The horizontal pivot arm 50 is considerably shorter than the vertical pivot arm 48. The axis 56 is configured in such a way that it extends generally perpendicular to the ground when the vertical pivot arm 48 is in the lowered condition that is, it extends at an inclination to the vertical when the vertical pivot arm 48 is in the raised position. The position sensor 32 is located in the vicinity of the axis 56 and recognizes the relative position between the vertical pivot arm 48 and the horizontal pivot arm 50.

Figure 4:
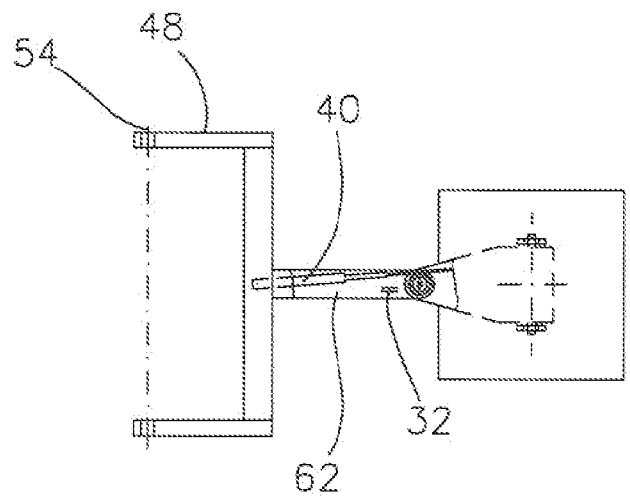
FIG. 4 shows a plan view of the discharge arrangement of FIG. 1 in a central position.
Figure 5:
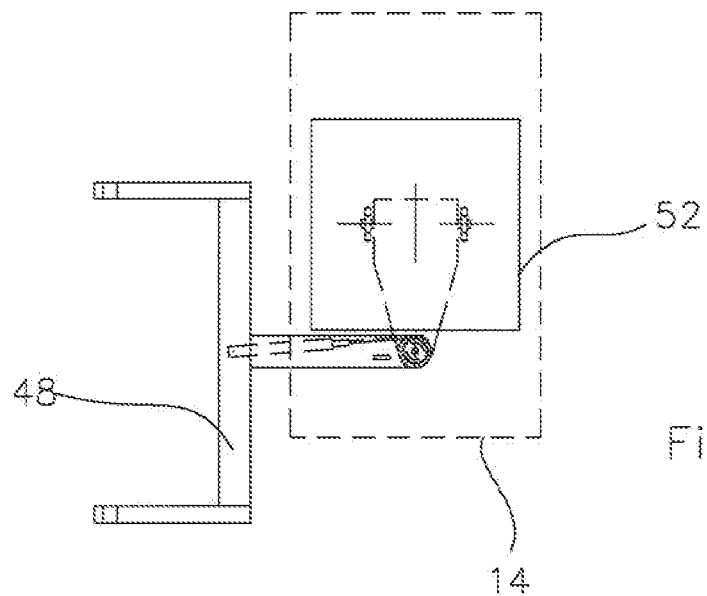
FIG. 5 shows a plan view of the discharge arrangement of FIG. 1 in a position pivoted to the right.
Figure 6:
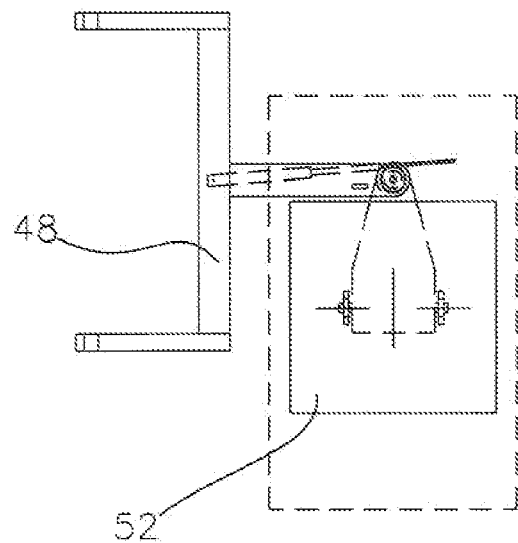
FIG. 6 shows a plan view of the discharge arrangement of FIG. 1 in a position pivoted to the left.

The carrier 52 is configured as a trough and is shaped in such a way that it can retain a bale 14 with its circumferential surface 46 in a secure position and hold it during the movement to the ground. The carrier 52 can pivot in the vertical direction about the axis 58, where the axis 58 may be configured in the same manner as the other axes 54, 56. In a neutral position, as it is shown in FIGS. 2 and 4, the axis 58 extends in the horizontal direction and transverse to the direction of the operation of the vehicle 10. The position sensor 34 is provided in the vicinity of the axis 58 and thereby recognizes the position of the carrier 52 relative to the horizontal pivot arm 50. The actuating arrangement 42 operates between the carrier 52 and the horizontal pivot arm 50 and operates in the same manner as the other actuating arrangements 38 through 42, controlled by the computer 28 either electrically or electro-hydraulically. The position sensor 34 together with the inclination sensor 26, the computer 28 and the actuating arrangement 42 are in a position that is capable of retaining the carrier 52 in a horizontal position at all times, that is even if the vehicle 10 operates down a slope or up a slope; accordingly it cannot happen that the bale 14 rolls down from the carrier 52. As can be seen in FIG. 2, the carrier 52 is extended towards the rear so that on the one hand it provides a gentle deposit of the bale 14 on the ground and, on the other hand, the bale 14 cannot roll down form the carrier 52 during operation up a slope.

Obviously, lines current sources etc. are provided in the control arrangement 12 that, however, are neither shown nor described since they occur automatically, According to the above description, the arrangement operates as follows.

During operation, the inclination sensor 26 generates a signal that it transmits to the computer 28 and from which the latter recognizes in which position the vehicle 10 is located relative to a line directed at the center of the earth. For example, the vehicle 10 is inclined to the side, if an axis of rotation through the wheels 24 of the chassis 20 follows the inclination of a slope or is tilted to the front or to the rear, when the vehicle 10 is operated up or down a slope. Obviously, the vehicle 10 car also be inclined in both directions. With each inclination, the danger exists that a bale 14 located on the carrier rolls down from it or rolls down the slope after itws deposit on the ground.

The computer 28 generates a signal that:
a) generates a display on the display arrangement 36
b) operates on the actuating arrangement 68 and/or
c) operates upon one or more of the actuating arrangements 38 through 42.

In case of an inclination on the display arrangement 36 either only a warning notice is issued or a reposition of the vehicle 10 is demanded into a position that lies outside the critical area for the deposit of the bale 14.

If the computer 28 is to prevent only one unloading of the bale 14 from the vehicle 10, an activation of the actuating arrangement 68 is prevented.

In the case that a semi-automatic or fully automatic control or regulation of one or move of the actuating arrangements 38 through 42 is to take place, in such a way that the bale 14 is safely accepted by the vehicle 10 and lowered to the ground, so that it comes to rest in such a way that it does not roll away, the following takes place:

The actuating arrangement 38 through 42, particularly the actuating arrangement 40 is activated in such a way that the longitudinal centerline of the bale 14 comes to lie parallel to the inclination of the slope. In this way, no rolling torque is developed in the direction down the slope. Depending on the position in which the vehicle 10 is located on the slope a pivot arc of the horizontal pivot arm 50 may not be adequate for 90° in one direction to deposit the bale 14 safely on the ground; in its case the horizontal pivot arm 50 must be pivoted in the other direction.

Having described the preferred embodiment, it will become apparent that various modifications can be made without departing from the scope of the invention as defined in the accompanying claims.

The invention claimed is:

1. In combination with a vehicle including a chamber for carrying a cylindrical bale, an outlet arrangement being selectively operated for permitting a formed bale to exit said chamber and a discharge arrangement attached to the vehicle for receiving a bale from the chamber and for being moved relative to said chamber for subsequently depositing the bale onto the ground, a control arrangement, comprising: an inclination sensor for sensing the inclination of the vehicle in a transverse direction and a longitudinal direction and for sending an inclination signal representing the sensed inclination, the inclination sensor is positioned on the vehicle wherein the inclination signal is for using by an operator information from which a correct repositioning of the vehicle may be done so that a carried bare may be safely transferred to the discharge arrangement from the chamber for subsequently being deposited onto the ground.

2. The combination, as defined in claim 1, wherein said control arrangement includes a visual display arrangement coupled for receiving said inclination signal from said inclination sensor and for indicating whether or not said bale may safely deposited.

3. The combination, as defined in claim 1, wherein said control arrangement includes an acoustic device coupled for receiving said signal from said inclination sensor and for sounding an alarm for apprising an operator of an unsafe condition for depositing a bale on the ground.

4. The combination, as defined in claim 1, wherein said control arrangement includes a computer coupled to said inclination sensor for receiving said inclination signal; an actuating arrangement coupled to said vehicle and to said discharge arrangement and, coupled for receiving a positioning signal from said computer; and said computer being operable for generating said positioning signal in accordance with said inclination signal so that said actuating arrangement is actuated so as to bring at east one of said vehicle or discharge arrangement into a position in which a safe deposit of the bale is possible.

5. The combination, as defined in claim 4, wherein said discharge arrangement includes a carrier mounted or being pivoted about at least first and second axes; and said actuating arrangement including first and second actuators respectively coupled for effecting movement of said carrier about said first and second axes.

6. The combination, as defined in claim 5, wherein said carrier is concave.

7. The combination, as defined in claim 5, and further including a horizontal pivot arm having a first end coupled to said carrier by a connection defining said first pot axis; said first actuator being coupled between said horizontal arm and said carrier for selectively tilting said carrier about said first axis; a vertical pivot arm mounted to said vehicle for pivoting about a third axis; a third actuator being coupled between said vehicle and said vertical pivot arm for selectively effecting movement of said vertical pivot arm about said third axis; said horizontal arm being connected to said vertical pivot arm for pivoting about said second axis; and said second actuator being coupled for selectively causing said horizontal pivot arm to be pivoted about said second axis, with said second axis being inclined from vertical when said vertical pivot arm is in a raised position.

8. The combination, as defined in claim 7, wherein said control arrangement includes position sensors associated with each of said first, second and third axes for generating respective signals representing the respective positions of said carrier, said horizontal arm and said vertical arm; and said position sensors being coupled to said computer.

9. The combination as defined in claim 1, wherein said control arrangement includes a computer coupled to said inclination sensor for receiving said inclination signal and wherein said chamber includes an outlet arrangement mounted for movement between a closed position, wherein a carried bale is prevented from being discharged from the chamber, and an open position, permitting the carried bale to be discharged from the chamber; an actuating arrangement including an actuator coupled to said outlet arrangement for selectively moving it between said closed and open positions; and said computer being coupled to said actuating arrangement for controlling said actuator in accordance with said inclination signal so as to prevent discharge of the carried bale in the event the inclination of the vehicle is such as to create an unsafe condition for such discharge.

10. The combination, as defined in, claim 1, wherein said control arrangement includes a computer coupled to said inclination sensor for receiving said inclination signal, and wherein said vehicle is equipped with a bale weighing arrangement for generating a weight signal representing the weight of a bale carried by the vehicle; said weighting arrangement being coupled or providing said weight signal to said computer; and said computer operating to produce a corrected weight signal taking into account an inclination of said vehicle represented by said inclination signal.

* * * * *